United States Patent [19]

Sierra

[11] Patent Number: 4,975,295
[45] Date of Patent: Dec. 4, 1990

[54] INSTANT COFFEE TABLETS

[76] Inventor: Mario A. M. Sierra, 4a. Avenida 2-23, Zona 9, Ciudad Guatemala, Guatemala

[21] Appl. No.: 422,564

[22] Filed: Aug. 31, 1989

Related U.S. Application Data

[63] Continuation-in-part of Ser. No. 237,413, Aug. 29, 1988, abandoned.

[51] Int. Cl.$^5$ .................................................. A23F 5/12
[52] U.S. Cl. ................................... 426/285; 426/594
[58] Field of Search ............................ 426/594, 595, 285

[56] References Cited

U.S. PATENT DOCUMENTS

| | | | |
|---|---|---|---|
| 1,641,446 | 9/1927 | McColl | 426/285 X |
| 1,723,069 | 8/1929 | Pauly | 426/595 |
| 1,762,690 | 6/1930 | Kopf | 426/595 |
| 1,951,357 | 3/1934 | Hall | 426/285 X |
| 2,053,106 | 9/1936 | Piacentini | 426/285 X |
| 3,889,000 | 9/1975 | Cante et al. | 426/595 X |
| 3,892,867 | 7/1976 | Sebroonman | 426/594 X |
| 4,552,771 | 11/1985 | Füllberth et al. | 426/576 X |

*Primary Examiner*—Joseph Golian
*Attorney, Agent, or Firm*—Richard C. Littman

[57] ABSTRACT

A water-soluble coffee tablet comprising a mixture of ground coffee and an agglutinating agent is manufactured under arid conditions by grinding soluble coffee powder in the presence of an agglutinating agent to produce a granular mixture, then sifting the granulated mixture through a thin sieve to obtain a homogenous mixture, and compressing the homogenous mixture to form a coherent tablet. The coffee tablets may be individually sealed in an impervious wrapping or enclosed in air-tight containers to retain the flavor and aroma characteristics of the product under long-term storage.

8 Claims, No Drawings

INSTANT COFFEE TABLETS

CROSS-REFERENCE TO RELATED APPLICATION

This application is a continuation-in-part of application Ser. No. 237,413 filed Aug. 29, 1988, now abandoned.

BACKGROUND OF THE INVENTION

1. Field of the Invention

This invention relates to water-soluble coffee tablets and to a method of manufacturing the same. More particularly, the present invention is concerned with a water-soluble coffee tablet made from a mixture of "instant coffee" and an edible agglutinating agent.

2. Description of the Prior Art

A number of processes have been proposed in the prior art for producing "instant coffee" which readily dissolves in hot water and is commercially available as bulk powder contained in a sealed jar or formulated into tablets or cubes. Coffee in powder form presents a problem in measuring and cannot be conveniently dispensed without spillage. Also, powdered coffee will absorb moisture on repeated exposure of the opened jar and thereby, lose valuable flavor and aroma. Coffee tablets or cubes, which are usually sufficient to make one cup of the beverage, are conventionally prepared from soluble coffee extractives. This method involves subjecting ground coffee beans to the action of an extracting solvent and evaporating the concentrate abstract to the condition of an agglomerate, which is compressible into tablet form. Such coffee tablets and extraction procedures for preparing the same are described in U.S. Pat. No. 1,137,265 to Hubner and U.S. Pat. No. 3,121,635 to Eldred. Also, U.S. Pat. No. 1,951,357 to Hall describes a method of forming a compressed coffee tablet by incorporating with the coffee extract a liquid binder containing gelatin and dextrin. However, coffee tablets formed by these prior procedures have disadvantages in that the flavor of the pure coffee extractives is always lost in the course of formulation since the extrinsic binder or vehicle is never completely removed from the beverage which affects its taste and appearance.

Further, it is widely known in the art of tablet-making to include a binder material with the active ingredient to hold the tablets together. However, the use of conventional binders in coffee tablets is undersirable, resulting in a beverage that contains extraneous ingredients that adversely affect the taste characteristics of pure coffee.

It is, accordingly, an object of the present invention to provide an "instant" coffee composition in tablet or cube form having improved dissolution properties and taste.

Another object of the invention is to provide a soluble coffee tablet which facilitates the retention of flavor and aroma components of pure coffee extractives and can be stored for long periods without deterioration.

A primary object of this invention is to provide an efficient method for manufacturing an improved soluble coffee tablet which excludes the use of conventional binders or vehicles which adversely affect the taste and appearance of the resulting beverage.

Other objects and advantages of the invention will become apparent from the following description.

SUMMARY OF THE INVENTION

The aforesaid objects are accomplished by the present invention wherein an improved "instant" coffee tablet or cube is provided comprising a homogenous mixture of soluble coffee and an edible agglutinating agent. The coffee tablets of the invention readily dissolve in water and are manufactured by grinding a mixture of soluble coffee and an edible agglutinating agent in a low-humidity atmosphere to form a granular mixture, sifting the granulated mixture through a thin sieve to obtain a homogenous mixture of hygroscopic components, and compressing the homogenous mixture under sufficient pressure to form a coherent tablet having a predetermined size and shape.

The formulated coffee composition of the present invention may also contain additional taste-enhancing ingredients, such as saccharin and powdered liquors. The invention also contemplates sealing each tablet in an impervious wrapping so that the flavor and aroma of the product is retained under long-term storage.

The above description, as well as further objects, features and advantages of the present invention, will be more fully appreciated by reference to the following detailed description.

DESCRIPTION OF THE INVENTION

This invention provides a readily water-soluble coffee tablet comprising a homogenous mixture of soluble coffee and an effective amount of an edible agglutinating agent. The formulated coffee product is manufactured in a low-humidity atmosphere from crushed or ground instant coffee powder. It is an essential feature of this invention in the manufacture of the soluble coffee tablets that the powdered coffee be reduced by grinding to the appropriate particulate state.

The process of the present invention starts with soluble coffee powder comprising pure extractives which are now widely known as "instant" coffee. The pure powdered coffee of this character consists of granulated particles in the form of hollow, quasi-spherical globules. The term "soluble coffee", as used herein, refers to powdered coffee in this form. In accordance with the invention, the soluble coffee is then reduced to a finely-divided mass by grinding. An edible agglutinating agent in the form of a powder is added to the powdered coffee during grinding to produce a granular mixture of highly hygroscopic components. Since this granulated mixture readily absorbs water, it is a prerequisite of the present process that the manufacturing procedure be conducted under substantially arid conditions. The manufacturing environment may be controlled by an air conditioner to provide a low-humidity atmosphere in which the relative humidity does not exceed about 40%. Preferably, the relative humidity of the environment is adjusted to under 30%.

A significant advantage of the invention is that the agglutinin is edible, enhances dissolution and has food properties which do not adversely affect the taste of pure coffee extractives. While neutral gelatin is the preferred agglutinating agent, the invention contemplates the use of other hygroscopic materials having the desired properties of gelatin which can be substituted in whole or in part for gelatin. In general, the agglutinating agent may comprise up to about 25% by weight of the coffee composition and, preferably, the proportion of gelatin is about 1 part by weight per 3.6 parts by weight of soluble coffee.

The mixture of soluble powdered coffee and agglutinating agent may be crushed to a granular particulate by grinding with the aid of a mortar. The granulated mixture is then sifted with a thin sieve to obtain a homogenous mixture of finely-divided particles which is compressed into coherent tablets. The homogenous mixture should not be too finely divided since it would be difficult to compress into tablet form. If the homogenous mixture is too roughly divided the formulated coffee tablet would not readily dissolve in water. Generally, the average size of the divided particles should pass through a sieve approximately 40–50 mesh in size. Preferably, the sieve size is between about 42 and 44 mesh.

After sifting through a thin sieve, the resulting homogenous mixture of hygroscopic components retains its granular consistency but is sufficiently agglutinous to undergo compression to form uniform tablets. Any of the various types of presses devised for molding particulate materials into tablets may be suitable. Hydraulic presses are conveniently employed because they permit accurate control of the pressure applied, but mechanical presses may also be used. The completed tablets are dosified, which is usually sufficient to make one six-ounce cup of coffee per tablet. Placed in a cup of boiling water a single tablet will dissolve completely without stirring in less than 60 seconds. Preferably, each tablet weighs about 3.5 grams and has a diameter of about 26 mm of thickness. This preferred dimension gives a tablet that is thick enough to resist fracture and offers a relatively large ratio of surface-to-water volume for rapid dissolution. The tablets can be formulated into any desired shape and can be individually wrapped in heat-and-humidity-resistant material, such as film, foil or wax paper. Alternatively, the coffee tablets may be stored without individual wrapping in air-tight containers for long periods without deterioration.

In yet another alternative, the coffee composition may also be mixed with other ingredients such as powdered milk, saccharin, powdered liquor, cardamom or other aromatic essences to impart additional flavor and vary the taste characteristics of the coffee beverage. These optional ingredients are homogeneously dispersed throughout the coffee product and may be added to the mixture prior to compression to form the tablet. The amount of additional ingredients incorporated into the mixture may vary within wide limits, typically less than 5% by weight, depending upon the size of the coffee tablet.

The coffee tablets manufactured by the present invention will have a shelf-life of over twelve months. During storage, the flavor and/or aromatic constituents are effectively protected against deteriorating from the environment and are not released until desired. Also, the coffee tablets are firm and resist breakage during handling, yet have excellent solubility.

The present invention may be illustrated by reference to the following example which is for the purpose of illustration only and is not in any way to be considered as limiting.

EXAMPLE

A mixture of about 0.75 grams of gelatin and 2.70 grams of powdered instant coffee is crushed in a mortar under an air conditioning environment in which the relative humidity averages less than 30%. Grinding continues until the mixture was reduced to a finely-divided mass of particles. This mixture of granulated particles was then sifted on a size 42 mesh sieve to obtain an homogenous mixture. The resulting homogenous mixture was compressed in a conventional tabletter to form a firm tablet weighing about 3.45 grams.

Coffee preparation involved depositing the tabletted form of instant coffee prepared above in a 6-ounce cup of near-boiling water. Dissolution of the tablet readily occurred with rapid distribution of the coffee throughout the water. A full-flavored coffee beverage with an enhanced pure coffee taste was noted.

Various modifications may be made in the process according to the above example. For instance, partially-decaffeinated soluble coffee powder may be used as the essential coffee component. Also, hygroscopic edible agglutinating materials other than powdered neutral gelatin can be used. In particular, 16 mg of saccharin may be added to the former mixture if an artificial sweetener is desired.

While the invention has been particularly shown and described with reference to preferred embodiments thereof, it will be understood by those skilled in the art that various changes in form and detail may be made therein without departing from the spirit and scope of the invention.

I claim:

1. A method of manufacturing a water-soluble coffee tablet comprising the steps of:
   grinding a mixture consisting of about 3.6 parts by weight of soluble coffee and about 1 part by weight of gelatin to produce a granular mixture having a finely-divided mass of particles;
   sifting the granulated mixture with a thin sieve to obtain a homogenous mixture of hygroscopic components; and
   compressing said homogenous mixture under sufficient pressure to form a coherent tablet having a predetermined size and shape, wherein said steps are conducted under substantially arid conditions.

2. The method of claim 1 wherein said steps are carried out in a low-humidity atmosphere.

3. The method of claim 2 wherein the relative humidity does not exceed about 40%.

4. The method of claim 3 wherein the relative humidity is under 30%.

5. The method of claim 1 wherein the size of said sieve is approximately 40–50 mesh.

6. The method of claim 5 wherein the size of said sieve is between about 42 and 44 mesh.

7. The method of claim 1 wherein the coffee tablet weighs about 3.5 grams.

8. The method of claim 1 wherein the coffee tablet has a diameter of about 26 mm per 0.08 mm of thickness.

* * * * *

UNITED STATES PATENT AND TRADEMARK OFFICE
CERTIFICATE OF CORRECTION

PATENT NO.   : 4,975,295
DATED        : Dec. 4, 1990
INVENTOR(S)  : Mario A.M. Sierra It is certified that error appears in the above-identified patent and that said Letters Patent is hereby corrected as shown below:

Item [76] Inventor -

Change "Mario A.M. Sierra"
  to --Mario A. Montenegro Sierra--

Signed and Sealed this

Fifth Day of March, 1991

Attest:

HARRY F. MANBECK, JR.

*Attesting Officer*              *Commissioner of Patents and Trademarks*